(12) United States Patent
Moriarty et al.

(10) Patent No.: US 6,256,118 B1
(45) Date of Patent: Jul. 3, 2001

(54) ULTRAVIOLET CURABLE RIVETING OF PRECISION ALIGNED COMPONENTS

(75) Inventors: Charles J. Moriarty, Rochester; Dennis E. Boldt, Medina, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/083,359

(22) Filed: May 22, 1998

(51) Int. Cl.⁷ .................................................. H04N 1/04
(52) U.S. Cl. ........................... 358/483; 358/474; 358/471
(58) Field of Search .................... 358/482, 483, 358/474, 471, 400, 514, 513; 250/239; 428/138, 139; 382/312

(56) References Cited

U.S. PATENT DOCUMENTS

| | | |
|---|---|---|
| 2,366,274 | 1/1945 | Luth et al. ............................ 428/223 |
| 2,391,938 | 1/1946 | Baker ...................................... 383/78 |
| 2,458,152 | 1/1949 | Eakins ................................... 264/230 |
| 3,350,249 | 10/1967 | Gregoire ............................... 156/92 |
| 3,902,949 | 9/1975 | Norman ................................ 156/252 |
| 4,114,998 | 9/1978 | Shimuzu et al. ..................... 399/107 |
| 4,325,626 | 4/1982 | Murata et al. ....................... 399/159 |
| 4,374,617 | 2/1983 | Fisli ......................................... 399/5 |
| 4,376,579 | 3/1983 | Wakso et al. ........................ 399/117 |
| 4,766,455 | 8/1988 | Carter ................................... 399/116 |
| 4,814,895 | * 3/1989 | Harada et al. ....................... 358/514 |
| 4,823,160 | 4/1989 | Ikuta et al. .......................... 399/117 |
| 4,835,600 | * 5/1989 | Harada et al. ....................... 358/515 |
| 4,954,591 | 9/1990 | Belmares ............................. 526/264 |
| 5,310,434 | 5/1994 | Vives et al. ........................... 156/92 |
| 5,405,467 | 4/1995 | Young et al. .......................... 156/91 |
| 5,411,807 | 5/1995 | Patel et al. ............................ 428/412 |
| 5,426,131 | 6/1995 | Katsamberis .......................... 522/16 |
| 5,429,700 | 7/1995 | Hudson ................................ 156/223 |

FOREIGN PATENT DOCUMENTS

| | | |
|---|---|---|
| 16 27 771 | 9/1970 | (DE) . |
| 0 823 561 A1 | 2/1998 | (EP) . |
| 0 825 757 | 2/1998 | (EP) . |
| 2 552 684 | 4/1985 | (FR) . |
| 2 629 149 | 9/1989 | (FR) . |
| 2 147 289 A | 5/1985 | (GB) . |
| 2 147 289 B | 12/1987 | (GB) . |

\* cited by examiner

*Primary Examiner*—Cheukfan Lee
(74) *Attorney, Agent, or Firm*—Francis H. Boos, Jr.; Roland R. Schindler, II

(57) ABSTRACT

In a low cost film scanner, a CCD image sensor is precision aligned to a film plane scanning aperture and is mounted to the an intervening imaging housing assembly by means of a radiation (UV) curable adhesive of appropriate viscosity. With the sensor positioned within but in spaced apart relationship to a sensor housing segment of the housing assembly, the adhesive is injected through a mounting hole in a wall of the housing segment to adhere to the image sensor. An excess amount of the injected adhesive forms a cap over the mounting hole. The viscosity of the adhesive is such as the allow the adhesive to generally maintain its shape in the space between the sensor and the wall of the sensor housing segment. The spacing of the sensor from the sensor housing segment allows six degrees of freedom of movement of the sensor during the alignment operation after which the injected adhesive is curing in situ to form a sensor mount fastener with the sensor is precise alignment with the film plane aperture. The hardened cap over the mounting hole provides a solid mechanical bond of the fastener to the housing segment.

6 Claims, 2 Drawing Sheets

ULTRAVIOLET CURABLE RIVETING OF PRECISION ALIGNED COMPONENTS

CROSS REFERENCE TO RELATED APPLICATIONS

Cross reference is made to commonly assigned, copending U.S. applications Ser. No. 09/083,604, filed May 22, 1998, now U.S. Pat. No. 6,178,016, and entitled "IMAGING APPARATUS FOR A PHOTOGRAPHIC FILM AGE SCANNER" and Ser. No. 09/084,062, filed May 22, 1998 and entitled "ILLUMINANT HEAD ASSEMBLY FOR FILM IMAGE SCANNER".

FIELD OF THE INVENTION

The invention relates generally to the assembly of precision aligned components. More specifically, the invention relates to mounting and fastening of a CCD sensor to an illumination housing in a photographic film scanner.

BACKGROUND OF THE INVENTION

CCD sensors are employed in photographic film scanners to convert film images optically projected onto the sensor sites into digital image signals. For optimum performance, it is critical that the CCD be mounted in precise alignment with the plane of the film being scanned. Typically this has been accomplished by means of carefully machined mounting devices employed precision datum surfaces the align the CCD to the film plane. Such techniques, while effective, are costly to implement and are therefore not suitable for low cost film scanners.

The use of a molded polycarbonate light-tight housing to precision mount the CCD at a remote location from the film plane provides a good approach to low cost design but introduces the problem of how to precision align the CCD at the end of the housing without using costly molding materials and techniques. The use of mechanical fasteners or adhesive bonding of the CCD to the flanges of the housing can result in misalignment of the CCD with remote film plane since these techniques rely on the positioning of the CCD to the housing flanges and do not allow for independent alignment of the CCD to the film plane. There is therefore a need for a low cost mounting arrangement in which a component, like a CCD, can be mounted on a housing in precise aligmnent with a remote location, such as the film plane of a photographic film scanner.

SUMMARY OF THE INVENTION

This need is satisfied by the present invention in which there is provided a fastened assembly of components comprising a first component having a hole therethrough; a second component spaced from said first component and at least one radiation cured adhesive fastener adhesively secured to a surface of said second component and extending through the hole in said first component and formed with a cap to hold said second component in a fixed spaced-apart relationship to said first component.

In a preferred embodiment of the invention, there is provided a sensor illumination housing assembly for a photographic film scanner which comprises an elongated illumination housing terminating at one end in a solid state image sensor housing segment having at least one hole therethrough; solid state image sensor means positioned in the sensor housing segment at a determined spaced-apart relationship to said sensor housing segment; and a radiation cured adhesive fastener extending through said hole, said fastener being adhesively secured at one end to said image sensor means and having a cap formed at the other end to mechanically secure the image sensor at said determined spaced-apart relationship to the sensor housing segment.

In another aspect of the invention there is provided a method of assembling a solid state imaging sensor to an illumination housing having a sensor housing segment at one end and a film plane aperture at the other end, wherein the method comprises providing said sensor in the sensor housing segment spaced from the inner surface of the housing segment; injecting a predetermined amount of viscous, radiation curable adhesive through a plurality of holes in the sensor housing segment to provide contact of the adhesive with a surface of the sensor and to form a cap over the hole at the other end of the adhesive; aligning said sensor in a determined position relative to said film plane aperture; and after aligning said sensor, curing the injected adhesive to form a solid fastener adhesively bonded to said sensor and mechanically to said sensor housing segment with said sensor in spaced-apart relationship to said sensor housing segment.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
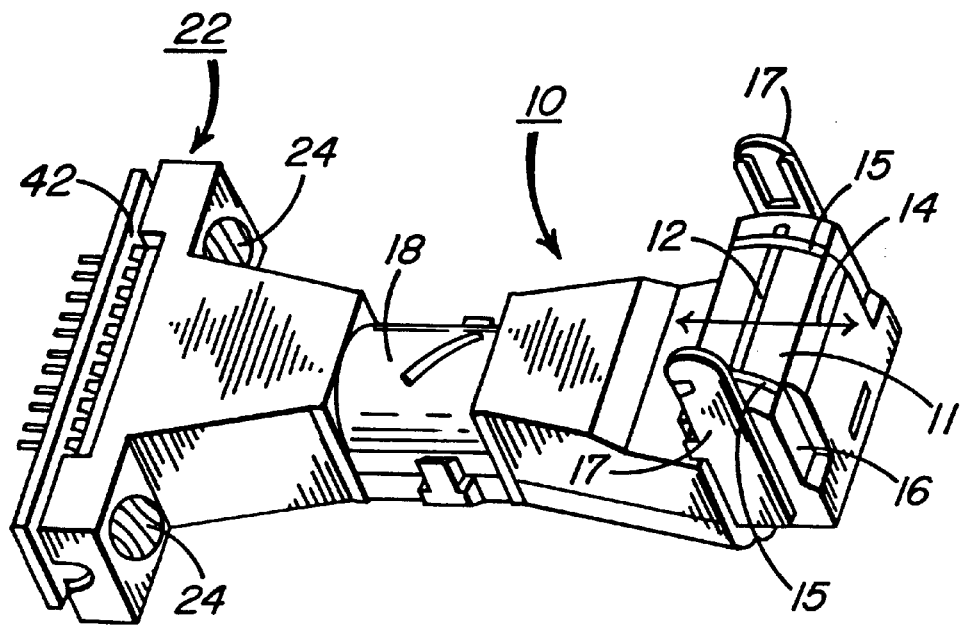
FIG. 1 is a perspective illustration of an illumination housing assembly embodying the present invention.

In FIG. 1, there is shown an integral imaging housing assembly 10 which comprises a portion of a film scanner module. The film scanning end 11 of the imaging housing assembly includes an elongated film scanning aperture 12 formed transversely of film path 14. The scanning aperture 12 is provided with a pair of integral film rails 15 which define the film plane over the scanning aperture. Light from a light source (not shown) mounted on support arms 17 is projected through the film being scanned (not shown) and through the scanning aperture 12 in the imaging housing assembly 10. The film scan light is reflected 45° by an internal mirror, mounted at 16, through a focusing lens, mounted internally at 18 onto a solid state image sensor 21 (FIG. 2) which is part of an image sensor assembly 20 mounted in accordance with a feature of the invention in sensor housing segment 22 of the imaging housing assembly 10.

As will be described in more detail below, the sensor assembly is mounted to the sensor housing segment 22 by means of radiation cured adhesive fasteners 24. Imaging housing assembly 10, which is described in more detail in commonly assigned copending U.S. application Ser. No. 09/083,604, is unique in that when completely assembled, it forms a low cost integral imaging assembly, in which the sensor 21 is permanently aligned with the film scanning aperture 12 and the film plane defined by film rails 15 at the time of manufacture. As such, the imaging assembly 10 can be easily removed and replaced, should a sensor become defective during normal use, without the need for a critical alignment procedure by a service technician to align the replacement sensor 21 with the scanning aperture and film plane as would be required if the sensor and scan aperture/film plane were independently constructed.

Figure 2:
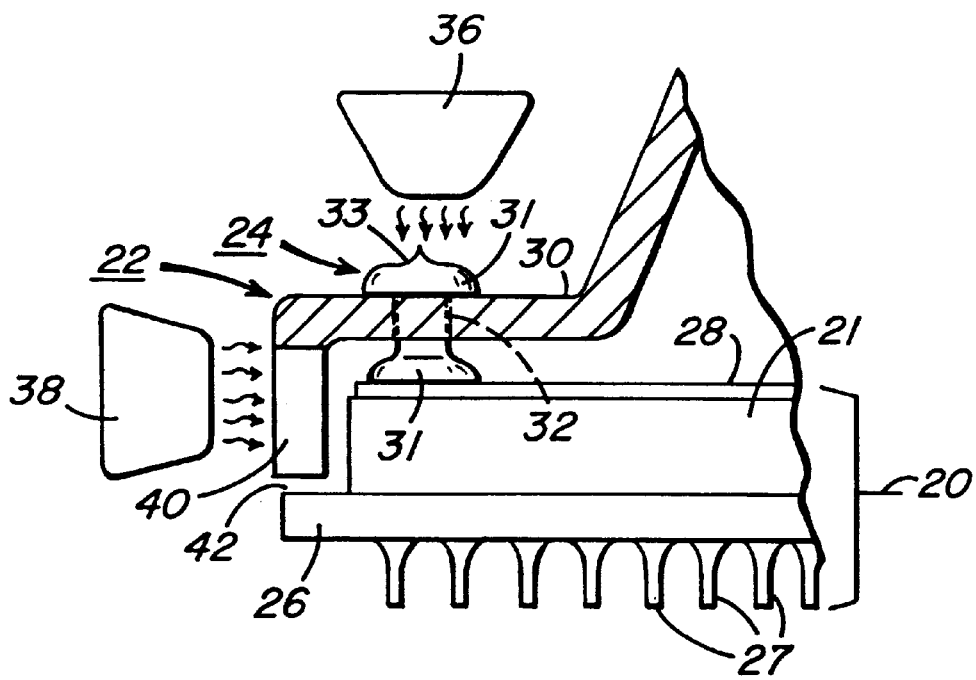
FIG. 2 is a sectional partial side view of the assembly of FIG. 1 illustrating the cured adhesive fastener arrangement of the invention.
Figure 3:
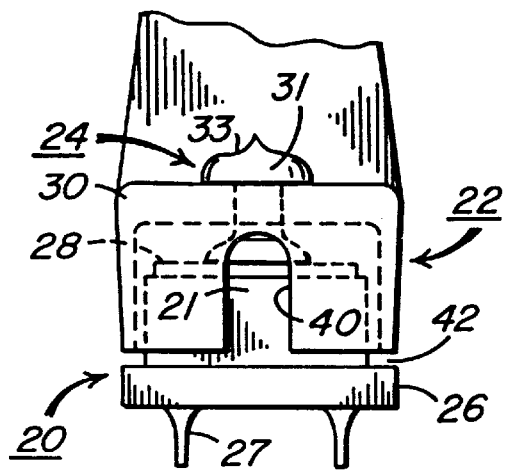
FIG. 3 is an end view of the lower portion of the illumination housing assembly of FIG. 1.
Figure 4:
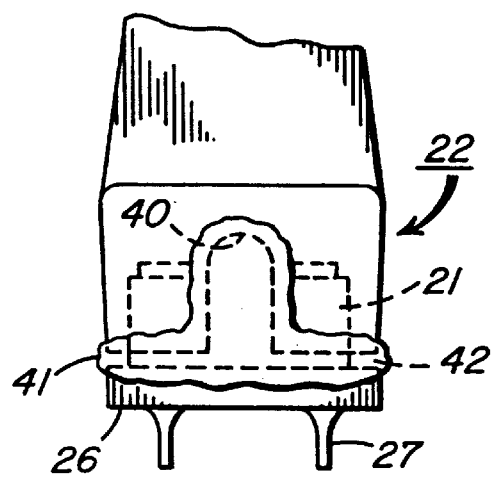
FIG. 4 is an end view similar to that of FIG. 3 illustrating the addition of opaque material to render the lower end of the illumination housing assembly light tight.

Turning now to FIGS. 2 and 3, the manner in which the image sensor assembly 20, and with it the image sensor 21, is precision mounted within the sensor housing segment 22 will now be described. As seen in FIG. 2, image sensor assembly 20 includes a linear CCD image sensor 21 mounted on a printed circuit substrate 26 with sensor terminals 27 projecting downwardly from the substrate. A plastic cover panel 28 is conventionally mounted on the face of the sensor 21 over the CCD elements to serve as protection for the CCD elements and also to filter out spectral light components outside the desired R,G,B spectrum of the film scan light. Using precision alignment fixtures of conventional type, sensor 21 is positioned within sensor housing segment 22 with the cover panel 28 spaced a determined amount from the inner surface of the housing segment wall 30 such that sensor 21 is preferably in approximate alignment with the scanning aperture 12 and the film plane defined by film rails 15. Preferably, at this juncture, no other part of the sensor assembly 20 is in contact with the wall of the housing segment wall 30 leaving a small space 42 therebetween. An amount of viscous, radiation curable adhesive 31 is then injected through mounting hole 32 formed in wall 30. The viscosity and amount adhesive injected will be dependent on the physical configuration of the housing, spacing, etc.; and is best empirically determined. In general, the viscosity and amount should be sufficient to ensure that the upper surface of protective cover panel 28 is wetted sufficiently to obtain good adhesion and also to obtain a slight excess of the adhesive on the top of the wall 30 to as to form a cap 33 over the mounting hole 32. Care should be taken to avoid any excess amount beyond this point so as to ensure cure-through of the adhesive during the ensuing curing step. The viscosity of the uncured adhesive is preferably such that, with good wetting on the surface of plate 28, the column of adhesive in the space between the sensor and the housing wall 30 will hold its shape until the curing step is completed. In an actual embodiment of the invention, an ultra-violet (UV) curable urethane acrylate adhesive UV2903, available from American Adhesive Technologies, Inc., having a viscosity of between 25,000–35,000 centipoise, was successfully employed.

Figure 5:
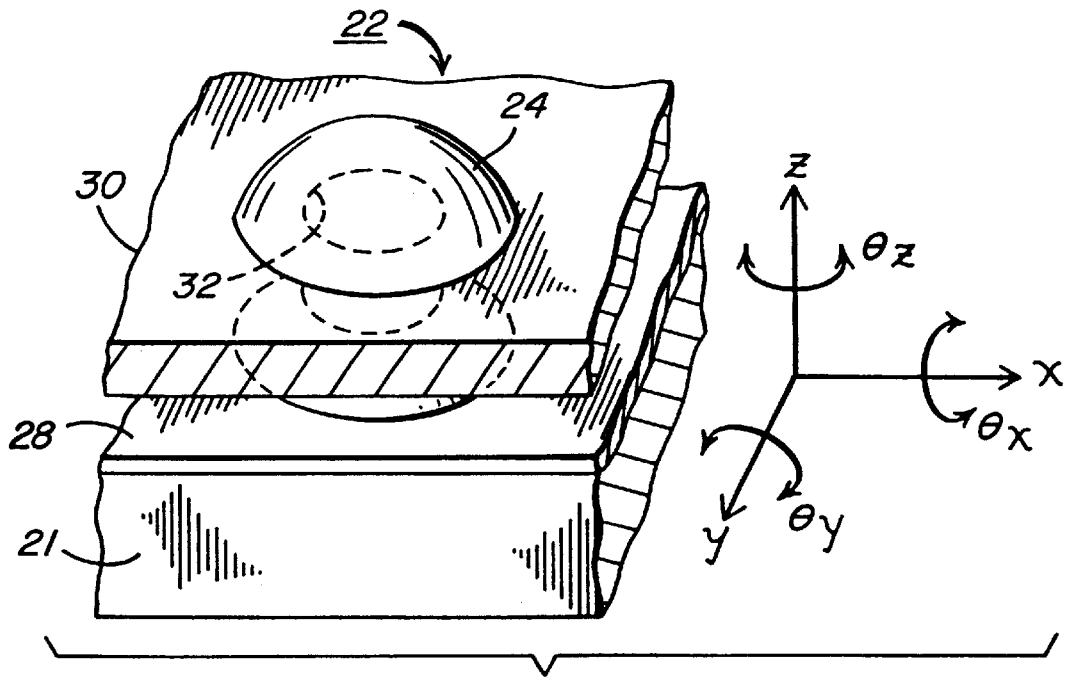
FIG. 5 is a sectional cutaway perspective view of the fastener arrangement of the invention illustrating the six degrees of freedom allowed by the invention during sensor alignment.

The sensor 21 is then aligned using a patterned light source (not shown) positioned at the film plane defined by film rails 15 and projected through the film aperture 12 onto the sensor 21 photosites. By monitoring the output signals from the sensor 21, the sensor position is adjusted by the alignment fixture, using micrometer adjustments in any of the six degrees of freedom shown in FIG. 5, until it is determined that the sensor is in proper alignment. Once proper alignment is achieved, sources 36, 38 of UV radiation are exposed to the adhesive in the mounting holes 32 until the adhesive 31 becomes hardened in place and the mounting of the sensor assembly 20 is firmly secured. For this purpose, an aperture 40 is formed in the wall 30 at each end of the housing segment 22 to allow UV source 38 to directly expose the column of adhesive the space between the sensor panel 28 and the inner surface of the housing wall 30. Source 38 serves to cure the cap 33 and inner column of the adhesive 31 to form a rigid mechanical bond of the adhesive fastener to the housing segment 22. In effect, a cured adhesive rivet is formed in which the rivet is adhesively bonded to the sensor panel 28 and mechanically attached to the segment wall 30. This is of particular importance when the material used for the imaging housing assembly is of the type which inherently does not produce a good adhesive bond to the adhesive material. In the case of the housing assembly 10, the assembly is made from a glass filled polycarbonate material which provides desirably low coefficient of expansion properties but which, unfortunately, does not bond well to UV curable adhesives. The mechanical bond provided by the cured adhesive cap overcomes this problem. Once the adhesive is cured, a matter of seconds, an opaque silicone adhesive material 41 is spread in place to close the aperture 40 and space 42 between the substrate 26 and the skirt of wall 30 to provide a light tight mount of the sensor within the housing segment.

The invention has been described in detail with particular reference to certain preferred embodiments thereof, but it will be understood that variations and modifications can be effected within the spirit and scope of the invention.

Parts List 10 imaging housing assembly
12 film scanning aperture
14 film path
15 film rails
15 light source support arms
16 internal mirror position
18 focusing lens section
20 imaging sensor assembly
21 image sensor
22 sensor housing segment
24 adhesive fastener
26 printed circuit substrate
27 sensor terminals
28 plastic cover panel
30 sensor housing segment wall
31 radiation curable adhesive
32 mounting hole
33 adhesive cap
36 UV radiation source
38 UV radiation source
40 curing access aperture
41 opaque silicone adhesive
42 space between substrate and wall

What is claimed is:

1. A sensor illumination housing assembly for a photographic film scanner comprising;
   an elongated illumination housing terminating at one end in a solid state image sensor housing segment having at least one hole therethrough;
   solid state image sensor means positioned in the sensor housing segment at a determined spaced-apart relationship to said sensor housing segment;
   a radiation cured adhesive fastener extending through said hole, said fastener being adhesively secured at one end to said image sensor means and having a cap formed at the other end to mechanically secure the image sensor at said determined spaced-apart relationship to the sensor housing segment.

2. The assembly of claim 1 wherein said image sensor means comprises an image sensor mounted on a substrate and wherein an opaque compound is formed between said substrate and said sensor housing segment to make the sensor housing segment light tight.

3. The assembly of claim 1 wherein said elongated illumination includes a film plane aperture at an end thereof remote from the sensor housing segment and a film image light channel opening into said sensor housing segment, said sensor housing segment having a hole on opposite sides of said light channel; said sensor means includes an elongated linear sensor extending across said channel and having surface areas aligned with said holes and wherein a radiation cured fastener extends through each of said holes in adhesive contact with said sensor surfaces on opposite sides of said channel holding said sensor in said determined relationship to said film plane aperture.

4. The assembly of claim 3 wherein said sensor is mounted on a substrate and wherein an opaque compound is formed between said substrate and said sensor housing segment to make the sensor housing segment light tight.

5. The assembly of claim 3 wherein said sensor housing segment includes skirt walls surrounding said sensor and said skirt walls include an aperture providing line of sight access to said fastener to allow curing of the fastener in situ by an external radiation source.

6. The assembly of claim 3 wherein said fasteners comprise a radiation curable adhesive which, prior to curing, has a viscosity effective to wet the sensor surface for good adhesion and to generally hold its shape in the space between the sensor and the sensor housing segment prior to curing.

* * * * *